United States Patent [19]
Oshima et al.

[11] 3,873,472

[45] Mar. 25, 1975

[54] CATALYST FOR THE PURIFICATION OF EXHAUST GASES AND PROCESS FOR PREPARING THE CATALYST

[75] Inventors: Hiroshi Oshima; Koji Saiki; Hiroto Inoue, all of Kobe, Japan

[73] Assignee: Kanegafuchi Kagaku Kogyo Kabushiki Kaisha, Osaka-shi, Japan

[22] Filed: Oct. 26, 1973

[21] Appl. No.: 409,690

[30] Foreign Application Priority Data
Oct. 28, 1972  Japan............................. 47-108278
Jan. 30, 1973  Japan.............................. 48-12714

[52] U.S. Cl. ...................... 252/466 B, 423/213.5
[51] Int. Cl. ...................... B01f 11/08, B01f 11/22
[58] Field of Search............... 252/466 B; 423/213.5

[56] References Cited
UNITED STATES PATENTS
| | | | |
|---|---|---|---|
| 3,715,193 | 2/1973 | Strelzoff........................... | 252/477 R |
| 3,718,733 | 2/1973 | Gehri............................... | 423/213.2 |
| 3,773,894 | 11/1973 | Bernstein et al................ | 252/474 X |

*Primary Examiner*—Winston A. Douglas
*Assistant Examiner*—W. J. Shine
*Attorney, Agent, or Firm*—Armstrong, Nikaido & Wegner

[57] ABSTRACT

A catalyst for purifying exhaust gases containing carbon monoxide unburned hydrocarbons, or nitrogen oxides, which consists essentially of a base, an iron-aluminum alloy on the base and platinum group metal on the alloy. The catalyst possesses high activity and durability for long periods of time even when employed at high temperature.

9 Claims, No Drawings

3,873,472

CATALYST FOR THE PURIFICATION OF EXHAUST GASES AND PROCESS FOR PREPARING THE CATALYST

BACKGROUND OF THE INVENTION

The present invention relates to a novel catalyst for purifying exhaust gases from internal combustion engines, and more particularly relates to a novel catalyst for purifying automobile exhaust gases containing carbon monoxide, unburned hydrocarbons such as methane, ethane and propane, or nitrogen oxides. The catalyst of the invention has the advantages such as high activity, durability for long periods of time, heat resistance, impact resistance and abrasion resistance.

The metals of Groups I–B and IV to VIII of the Periodic Table and their oxides have been known as useful catalysts for the purification of exhaust gases from automobiles, and they have been employed in a form of alloy thereof as described in U.S. Pat. No. 3,565,574, in a form of pellet or granule deposited on an inert carrier such as alumina, silica or zirconia as described in U.S. Pat. No. 3,524,721 or in a form of honeycomb deposited on an inert carrier such as alumina, mullite or cordierite as described in U.S. Pat. Nos. 3,331,787, 3,109,715 and 3,441,382. However, such catalysts very often have been of insufficient activity and unable to withstand extremely severe operating conditions over long periods of time. For instance, a catalyst comprising an unsupported alloy is capable of sustaining the physical stresses and strains, but is not sufficiently active and moreover must be employed at comparatively high temperature in order to make its catalytic activity exert. A catalyst of pellet or granule type is easy to break up by abrasion, and causes the deterioration of activity and the increasing of pressure loss when packed. A catalyst of honeycomb type is also easy to break by impact as in vibration of automobile, especially when heat is added. Further, a catalyst of pellet, granule or honeycomb type is inferior in mechanical strength since such materials as alumina, mullite and cordierite are employed as a carrier.

OBJECT OF THE INVENTION

It is an object of the present invention to provide a novel catalyst for purifying exhaust gases containing carbon monoxide, unburned hydrocarbon or nitrogen oxides.

Further object of the invention is to provide a catalyst for purifying exhaust gases from internal combustion engines.

More further object of the invention is to provide a catalyst for purifying exhaust gases superior in high activity, long life, durability for long periods of time, heat resistance, impact resistance and abrasion resistance.

Still further object of the invention is to provide methods for preparing the above-mentioned catalyst.

These and other objects of the invention will become apparent from the description hereinafter.

DESCRIPTION OF THE INVENTION

It has now been found that the above-mentioned objects are accomplished by a catalyst consisting essentially of a base such as steel, an iron-aluminum alloy provided on the base in which an average ratio of iron and aluminum falls in the range of about 1:10 to about 10:1 by atomic ratio and platinum group metal or mixture thereof deposited on the iron-aluminum alloy in an amount of about 0.02 to about 20 g./square meter of apparent surface area. The catalyst of the invention is characterized by unevenness of the surface. That is, a large number of hollows having an average diameter in the range of 10 to 100 $\mu$ are present at least on surface zone of the iron-aluminum alloy layer, by which the actual surface area of the iron-aluminum alloy provided on the base is increased to more than 2 times, e.g. as much as about 10 times the apparent surface area of the base. As a result the platinum group metal is supported on such an uneven surface of the alloy, the actual surface area of the catalyst of the invention can be remarkably increased.

As a base, there can be widely employed commercial steels and irons in various forms such as plate, pipe, rod, honeycomb or wire gauze, preferably wire gauze. Especially, stainless steel is suitably employed as the base.

The iron-aluminum alloy on the base is represented by $Fe_xAl_y$ in which $x$ and $y$ are a value of about 1 to about 10, respectively. There is no necessity that the composition of the alloy is uniform all over. That is to say, at least the surface zone of the alloy is necessary to be in the above-mentioned proportion of $Fe_xAl_y$. However, in case the average content of iron is more than 10 times the aluminum content, the catalyst of the invention becomes poor in heat resistance and can not withstand the employment for long periods of time. And in case the average content of aluminum is more than 10 times the iron content, the melting point of the alloy lowers and, therefore, the catalyst of the invention can not be employed at high temperature.

In accordance with the present invention, the actual surface area of the alloy must be more than 2 times the apparent surface area. In case the actual surface area of the alloy is less than 2 times the apparent surface area, the catalyst of the invention shows only low activity and can not be utilized.

There is no specific limitation in thickness of the iron-aluminum alloy, but if it is too thick, the catalyst of the invention becomes easy to break up to some extent. Also, it is not absolutely necessary for the invention to cover the base completely with the alloy. However, in case the base is exposed in excess, the heat resistance of the catalyst tends to lower.

The catalytic materials employed in the present invention are platinum group metals. Especially, platinum and palladium are suitably employed. These materials can be employed individually or in a mixture thereof. As stated previously, the catalytic material is supported on the uneven surface of the alloy in an amount about 0.02 to about 20 g./square meter of apparent surface area. As a result, the actual surface area of the catalyst can be remarkably increased. The catalyst of the invention has the actual surface area of more than 5 times the apparent surface area, preferably has the actual surface area in the range of 30 to 300 times the apparent surface area. Therefore, the catalyst of the invention can show high activity. Moreover, the activity does not deteriorate when exposed at high temperature. For instance, when the newly prepared catalyst is heat-treated at a temperature of 800°C., the initial activity of the catalyst rather increases than decreases and thereafter there is little deterioration of the activity when repeatedly heated at a temperature of 800°C. Furthermore, the catalyst of the invention is superior in mechanical strength in case steels are employed as a base.

The catalyst of the invention is prepared by forming a layer consisting essentially of iron-aluminum alloy on the surface of the base and supporting platinum group metal on the alloy. The iron-aluminum alloy can be formed by applying a coating composition consisting essencially of aluminum powder and solvent or plating aluminum on the surface of such base as steel and then heat-treating the base covered or plated with aluminum in order to form the iron-aluminum alloy. Another method for forming the iron-aluminum alloy on the base is conventional calorizing procedure.

The base is applied with the coating composition by conventional methods such as dip coating, brush coating or spray coating, and dried over. As the coating composition, there can be employed one which aluminum powder is dispersed in solvent. In general, the coating composition containing about 30 % by weight of aluminum powder is employed. For instance, the coating composition containing 30 % by weight of aluminum powder, 20 % by weight of silicone oil, 5 % by weight of titan tetrabutoxide and 45 % by weight of organic solvent is suitably employed.

Also aluminum can be plated on the base by means of a conventional hot dipping procedure. The hot dipping is carried out by dipping the base in a melted aluminum at a temperature of about 700° to about 800°C., for instance, at a temperature of about 700°C. for about 3 minutes.

Thus the base is covered with aluminum, followed by heat-treatment for forming the iron-aluminum alloy. The heat-treatment is carried out at a temperature of about 500° to about 1,000°C. for several tens of minute to several hours in an atmosphere of inert gas or in air, by which iron and aluminum are diffused so as to form the iron-aluminum alloy on the surface of the base. In case of carrying out the heat-treatment in air, oxides weakly adhered to the surface of the alloy are formed. Such oxides are removed by grinding, acid-treatment, or the like.

The iron-aluminum alloy can be formed directly on the base by the well known calorizing procedure. The base is buried in powders of iron-aluminum alloy and heated at a temperature of about 1,000° to about 1,100°C. for several hours.

By any one of the above-mentioned procedures, the base having a desired shape can be covered with the iron-aluminum alloy layer having an uneven surface. Preferably, the procedure of applying the aluminum coating composition is employed since it is most simple and the base having various shapes can be readily treated. On thus obtained iron-aluminum alloy, platinum group metal is supported in an amount of about 0.02 to about 20 g./square meter of apparent surface area by a conventional method such as dipping, nonelectrode plating or electroplating. When platinum group metal is supported by dipping the base covered with the alloy in an aqueous solution of a water-soluble platinum group metal compound, the obtained catalyst may be reduced with hydrogen to remove the residual platinum group metal compound on the surface after supporting the metal.

The present invention is more particularly described and explained by means of the following illustrative examples.

EXAMPLE 1

A steel base (made of a steel [ASTM A 283–70, Grade C]) having a thickness of 1 mm., a length of 80 mm. and a width of 30 mm. was dipped in a melted aluminum at a temperature of 700°C. for 3 minutes. Then the steel base plated with aluminum was heated at a temperature of 1,000°C. for 2 hours in muffle furnace to form iron-aluminum alloy on the surface of the steel base, by which a carrier was obtained. After cooling thus obtained carrier, alumina formed on the surface of the iron-aluminum alloy was scraped off, and then the carrier was dipped in 0.1 % by weight of aqueous solution of chloroplatinic acid for 3 minutes. The carrier with platinum was taken out, and after water-washing and drying, the catalyst was reduced with hydrogen at a temperature of 200°C. for 1 hour. The resulting catalyst supported platinum in an amount of 0.34 g./square meter of apparent surface area.

By X-ray diffractiometry, it was observed that $FeAl_3$ and $Fe_2Al_5$ were formed on the surface of the iron-aluminum alloy. Also, the alloy had a large number of hollows having an average diameter of 50 $\mu$ and a depth of about 10 $\mu$ on its surface.

Thus obtained catalyst was cut to pieces having a size of about 5 mm. in length and width, and charged in a reactor made of stainless steel having an inner diameter of 16.7 mm. and length of 1 m. in which a pipe, for thermometer, having an outer diameter of 6 mm. was centered. The effective length of the catalyst charged in the reactor was 4 cm. The apparent surface area of the catalyst was 70 cm$^2$. After heat-treating the catalyst at a temperature of 800°C. for 2 hours in a stream of a synthetic exhaust gas containing 2 % by volume of CO, 2% by volume of $O_2$, 1,500 p.p.m. by volume of NO and the balance of nitrogen, an activity test of the catalyst was carried out by passing the same exhaust gas at a rate of 240 liters/hour through the reactor. The carbon monoxide conversion was obtained at 300°C., 400°C. and 500°C. by gas chromatography employing a Molecular Sieves 5 A as a packing and a thermal conductivity detector.

The results of the above conversion test of carbon monoxide were shown in Table 1.

On the other hand, the heat-treatment of the catalyst at a temperature of 800°C. was carried out repeatedly, but no deterioration of the activity was observed. Furthermore, the specific surface areas of the steel base, the carrier and the catalyst of the invention were measured by gas chromatography according to the method reported by F. M. Nelsen in "Anal. Chem., Vol. 30, No. 5, 1387 (1958)," and from the obtained results the actual surface areas of the carrier and the catalyst against one square meter of apparent surface area were calculated. The results were 8 m.$^2$ and 30 m.$^2$, respectively.

EXAMPLE 2

By the same procedure as in Example 1, the catalyst supporting platinum in an amount of 1.38 g./square meter of apparent surface area was obtained.

The carrier had substantially the same particulars as in Example 1. The actual surface areas of the carrier and the catalyst against one square meter of the apparent surface area were 8 m.$^2$ and 35 m.$^2$, respectively.

In addition to the conversion test of carbon monoxide, the conversion of nitrogen oxide was carried out by passing a synthetic exhaust gas containing 2 % by volume of CO, 1 % by volume of $O_2$, 1,500 p.p.m. by volume of NO and the balance of nitrogen under the same conditions except that the temperatures of the catalyst bed were 400°C., 500°C. and 600°C. The nitrogen oxide conversion was measured by chemiluminescence analysis.

Further, carbon monoxide conversion for an exhaust gas fed at a rate of 24 liters/hour, which contains 2 % by volume of CO, 2 % by volume of $O_2$, 1,500 p.p.m. by volume of NO and the balance of nitrogen, was obtained.

The results were shown in Table 1.

EXAMPLE 3

The same procedure as in Example 1 was repeated except that 0.1 % aqueous solution of palladium chloride was employed instead of chloroplatinic acid solution and the carrier was dipped for 10 minutes to give a catalyst supporting palladium in an amount of 1.65 g./square meter of apparent surface area.

The carrier had substantially the same particulars as in Example 1. The actual surface areas of the carrier and the catalyst against one square meter of the apparent surface area were 8 m.$^2$ and 100 m.$^2$, respectively.

The results of carbon monoxide conversion and nitrogen oxide conversion obtained under the same conditions as in Example 2 were shown in Table 1.

EXAMPLE 4

According to the procedures of Examples 1 and 3, the same carrier as in Example 1 was dipped in 0.8 % by weight of aqueous solution of chloroplatinic acid for 20 minutes, and then further dipped in 0.1 % by weight of aqueous solution of palladium chloride for 6 minutes. Thus obtained catalyst supported platinum and palladium, respectively, in an amount of 3.51 and 1.17 g./square meter of apparent surface area.

The actual surface area of the catalyst against one square meter of the apparent surface area was 140 m.$^2$.

The results of carbon monoxide conversion obtained under the same condition as in Example 1 were shown in Table 1.

EXAMPLE 5

A stainless steel base (made of a stainless steel [AISI 316L]) having a thickness of 0.5 mm., a length of 80 mm. and a width of 30 mm. was defatted with a chromic acid mixture, and then dipped in TAINETSU ICHIBAN K-023 (heat resisting coating composition, Aluminum powder content: 30 % by weight) made by Sutandaru Kenzai Kako Kabushiki Kaisha. After taking out and drying the base, the coated stainless steel base was heated at a temperature of 900°C. for 1 hour in air. Alumina formed on the surface of the iron-aluminum alloy was scraped off, and then thus obtained carrier was dipped in 1 % by weight of aqueous solution of chloroplatinic acid for 30 minutes. The carrier supporting platinum was taken out, and thereafter was treated by the same manner as in Example 1. The amount of platinum supported on the carrier was 4.0 g./square meter of apparent surface area.

By X-ray diffractiometry, it was observed that $FeAl_3$ and $Fe_2Al_5$ were formed on the surface of the iron-aluminum alloy. Also, the alloy had a large number of hollows having an average diameter of 20 $\mu$ and a depth of about 10 $\mu$ on its surface. The actual surface areas of the carrier and the catalyst against one square meter of the apparent surface area were 10 m.$^2$ and 50 m.$^2$, respectively.

The results of carbon monoxide conversion obtained under the same conditions as in Example 1 were shown in Table 1.

EXAMPLE 6

The same procedure as in Example 5 was repeated except that the coating composition consisting of 30 % by weight of aluminum powder, 20 % by weight of silicone oil (Shin-Etsu Silicone KF 965 made by The Shin-Etsu Chemical Industry Co., Ltd.), 5 % by weight of titan tetrabutoxide and 45 % by weight of organic solvent of which composition was 30 % by weight of toluene, 30 % by weight of xylene, 20 % by weight of ethanol and 20 % by weight of butanol was employed instead of TAINETSU ICHIBAN K-023.

The carrier had substantially the same particulars as in Example 5.

The actual surface areas of the carrier and the catalyst against one square meter of the apparent surface area were 10 m.$^2$ and 50 m.$^2$, respectively.

The results of carbon monoxide conversion obtained under the same conditions as in Example 1 were shown in Table 1.

COMPARATIVE EXAMPLE 1

The same procedure as in Example 1 was repeated except that platinum was not supported on the carrier.

The results of carbon monoxide conversion obtained under the same conditions as in Example 1 were shown in Table 1.

COMPARATIVE EXAMPLE 2

A steel base (made of a steel [ASTM A 283-70, Grade C]) was heated at a temperature of 800°C. for 2 hours in air.

The surface of the steel base was highly corroded due to the oxidation and could not be employed as a catalyst.

Table 1

| Example No. | Carbon monoxide conversion | | | Nitrogen oxide conversion | | |
|---|---|---|---|---|---|---|
| | 300°C. | 400°C. | 500°C. | 400°C. | 500°C. | 600°C. |
| | % | | | % | | |
| 1 | 5 | 50 | 100 | — | — | — |
| 2 | 5 | 60 | 100 | 10 | 60 | 80 |
| 2* | 10 | 100 | 100 | — | — | — |
| 3 | 10 | 90 | 100 | 15 | 30 | 70 |
| 4 | 10 | 80 | 100 | — | — | — |
| 5 | 5 | 30 | 90 | — | — | — |
| 6 | 10 | 50 | 95 | — | — | — |
| Comparative Example 1 | 0 | 0 | 0 | — | — | — |

*Flow rate of the exhaust gas: 24 liters/hour

COMPARATIVE EXAMPLE 3

On a steel base (made of a steel [ASTM A 283–70, Grade C]) having a thickness of 1 mm., a length of 80 mm. and a width of 30 mm., platinum was plated by means of electroplating. The electroplating was carried out in a plating bath containing 4 g./liter of chloroplatinic acid, 20 g./liter of ammonium secondary phosphate and 100 g./liter of sodium secondary phosphate by employing a carbon electrode as a cathode and passing a direct current of 1.25 A/dm.$^2$ in current density and of 2 V in voltage for 6 minutes. The amount of platinum supported on the steel base was 4.5 g./square meter of apparent surface area.

On the other hand, an aluminum base (99 % grade) was defatted with a chromic acid mixture and dipped in 1 % by weight of aqueous solution of chloroplatinic acid for 30 minutes. The amount of platinum supported on the aluminum base was 4.7 g./square meter of apparent surface area.

Thus obtained catalysts were heated in the same exhaust gas as in Example 1 at a temperature of 700°C. for 2 hours. The catalyst composed of platinum and the steel base was highly corroded due to the oxidation and could not be employed as a catalyst. The catalyst composed of platinum and the aluminum base was changed of its shape due to the melting and also could not be employed as a catalyst.

EXAMPLE 7

A catalyst was prepared and charged in the reactor by the same manner as in Example 1. Platinum supported on the steel base was 1.2 g./square meter of apparent surface area and the apparent surface area of the catalyst packed in the reactor was 70 cm.$^2$ A synthetic exhaust gas containing 2 % by volume of CO, 1 % by volume of $O_2$, 1,000 p.p.m. by volume of $CH_4$, 1500 p.p.m. by volume of NO and the balance of nitrogen was passed through the reactor at a rate of 240 liters/hour. The hydrocarbon conversion was measured by gas chromatography employing a flame ionization detector without packing.

The results of activity test were shown in Table 2.

Table 2

| Temperature of catalyst bed | CO conversion | $CH_4$ conversion | NO conversion |
|---|---|---|---|
| °C. | % | | |
| 600 | 100 | 90 | 70 |

There was no formation of $NH_3$.

The carrier had substantially the same particulars as in Example 1.

The actual surface areas of the carrier and the catalyst against one square meter of the apparent surface area were 8 m.$^2$ and 60 m.$^2$, respectively.

EXAMPLE 8

A steel base (made of a steel[ASTM A 283–70, Grade C]) having a thickness of 1 mm., a length of 60 mm. and width of 30 mm. was buried in powders of the iron-aluminum alloy (1 : 1 by weight) containing 5 % by weight of ammonium chloride, and heated at a temperature of 100°C. for 13 hours according to the calorizing treatment to give a carrier composed of the base and the alloy. Thus obtained carrier was defatted with a chromic acid mixture and dipped in an aqueous solution of chloroplatinic acid in concentration of 10 g./liter including formalin as a reduction agent for 10 minutes to carry out a nonelectrode plating. The amount of platinum supported on the carrier was 2.34 g./square meter of apparent surface area.

It was observed that FeAl was formed on the surface of the iron-aluminum alloy by X-ray diffractiometry. Also, the alloy had a large number of hollows having an average diameter of 80 $\mu$ and a depth of about 6 $\mu$ on its surface. The actual surface areas of the carrier and the catalyst against one square meter of the apparent surface area were 5 m.$^2$ and 60 m.$^2$, respectively.

Thus obtained catalyst was cut to pieces having the size of about 5 mm. in length and width, and charged in the reactor by the same manner as in Example 1. The apparent surface area of the catalyst packed in the reactor was 70 cm.$^2$ After heat-treating the catalyst at a temperature of 800°C. for 2 hours in a stream of a synthetic exhaust gas containing 2 % by volume of CO, 2 % by volume of $O_2$, 1,500 p.p.m. by volume of NO and the balance of nitrogen, oxidation of carbon monoxide to carbon dioxide was carried out by passing the same exhaust gas at a rate of 240 liters/hour through the reactor. The carbon monoxide conversions obtained at temperatures of 300°C., 350°C. and 450°C. were shown in Table 3.

EXAMPLE 9

The same steel base as in Example 1 was subjected to the calorizing treatment by the same manner as in Example 8. Then platinum was plated by means of electroplating. The electroplating was carried out in a plating bath containing 4 g./liter of chloroplatinic acid, 20 g./liter of ammonium secondary phosphate and 100 g./liter of sodium secondary phosphate by employing a carbon electrode as a cathode and passing a direct current of 1.3 A/dm.$^2$ in current density and of 3 V in voltage for 3 minutes. The amount of platinum supported on the carrier was 8.95 g./square meter of apparent surface area. The carrier had substantially the same particulars as in Example 8 and the actual surface areas of the carrier and the catalyst against one square meter of the apparent surface area were 5 m.$^2$ and 80 m.$^2$, respectively.

The carbon monoxide conversion was carried out by the same manner as in Example 8. The results were shown in Table 3.

Table 3

| Example No. | Carbon monoxide conversion | | |
|---|---|---|---|
| | 300°C. | 350°C. | 450°C. |
| | % | | |
| 8 | 30 | 50 | 80 |
| 9 | 10 | 40 | 95 |

EXAMPLE 10

The impact strength of the catalyst obtained in Example 8 was measured by employing Ro-Tap type sieve shaker made by Kabushiki Kaisha Yanagimoto Seisakusho. As a reference sample, a carrier [ALSIMAG–795 made by Minnesota Minning and Manufacturing Company (ceramic honeycomb type), of which size was 25 mm. in diameter and 50 mm. in length ] was employed. The catalyst of the invention and ALSIMAG–795 were heated at a temperature shown in Table 4 for 1 hour in air and subjected to the measurement. The sieve shaker was operated for 30 minutes, and the destroyed pieces which passed through the 10 mesh sieve were weighed. Loss due to the destruction was calculated by percentage by weight. Thus obtained values were shown in Table 4 as an index for the impact strength.

Further, the increase in quantity of the catalyst was measured when exposed at various temperatures. The measurement was carried out by heating the catalyst in muffle furnace at a temperature shown in Table 4 for one hour, and percentage of the increase in quantity to the original weight was calculated. Thus obtained values were also shown in Table 4 as an index for the heat resistance.

Table 4

| Treating temperature | Loss due to the destruction | | Increase in quantity |
|---|---|---|---|
| | The catalyst of the invention | ALSIMAG-795 | The catalyst of the invention |
| °C. | % by weight | | % by weight |
| room temp. | 0 | 14.0 | 0 |
| 600 | 0 | — | 0 |
| 800 | 0.025 | — | 0.02 |
| 1000 | 0.010 | — | 0.08 |
| 1200 | 0.050 | — | 0.13 |

EXAMPLE 11

A stainless steel wire gauze (made of a stainless steel [AISI 304]) for demister made by Naniwa Tokushu Kanaami Kabushiki Kaisha (No. 4012 type) having a space ratio of 94.5 %, a surface area of 1990 m.$^2$/m.$^3$ and a density of 432 kg./m.$^3$ was defatted with a chromic acid mixture, and thereon TAINETSU ICHIBAN K-023 made by Sutandaru Kenzai Kako Kabushiki Kaisha (heat resisting coating composition, Aluminum powder content: 30 % by weight) was applied by means of dip coating. After drying the coating composition, the wire gauze covered with aluminum was heated in muffle furnace at a temperature of 900°C. for 1 hour. The oxide scale formed on the surface was removed by water-washing and brushing to give the carrier consisting of the wire gauze and the iron-aluminum alloy. Then the carrier was dipped in 0.1 % by weight of aqueous solution of palladium chloride for 15 minutes, and taken out from the solution. Thus obtained catalyst was washed with water and dried. The amount of palladium supported on the carrier was 1.57 g./square meter of apparent surface area.

It was observed that FeAl$_3$ and Fe$_2$Al$_5$ were formed on the surface of the iron-aluminum alloy by X-ray diffractiometry. Also, the iron-aluminum alloy had a large number of hollows having an average diameter of 15 $\mu$ and a depth in the range of 3 to 8 $\mu$ on its surface. The actual surface areas of the alloy and the catalyst against one square meter of the apparent surface area were 13 m.$^2$ and 123 m.$^2$, respectively.

The same reactor as employed in Example 1 was charged with 4 g. of the catalyst. The catalyst in a form of gauze having a length of 17 cm. and a width of 4 cm. was wound on the inner pipe for thermometer. The effective length of the reactor was 4 cm.

The carbon monoxide conversion was carried out by passing a synthetic exhaust gas containing 2 % by volume of CO, 2 % by volume of O$_2$, 1,500 p.p.m. by volume of NO and the balance of nitrogen at a rate of 240 liters/hour or 24 liters/hour.

The results obtained at 250°C., 300°C. and 350°C. were shown in Table 5.

Table 5

| Flow rate | Carbon monoxide conversion | | |
|---|---|---|---|
| | 250°C. | 300°C. | 350°C. |
| liter/hour | % | | |
| 240 | 25 | 98 | 100 |
| 24 | 99 | 100 | 100 |

The catalyst was heated at a temperature of 800°C. for 5 hours, but no deterioration of the activity was observed.

On the other hand, the same reactor as employed in the above was charged with a platinum-alumina catalyst (granular form) made by Nippon Engelhard Kabushiki Kaisha (amount of platinum supported on alumina: 0.2 % by weight) in an amount of 4 g, and the carbon monoxide conversion was carried out by passing the same exhaust gas as in the above activity test at a rate of 240 liters/hour.

The initial activity in CO conversion of the platinum-alumina granular catalyst was 50 % at 230°C. and 80 % at 250°C. However, the activity after heat-treating at a temperature of 800°C. for 2 hours was 50 % at 285°C. and 80 % at 305°C. It is clear from the above result that the activity of the platinum-alumina granular catalyst is deteriorated when exposed at high temperature, and the catalyst of the invention is superior in heat resistance, by which the long life is expected.

EXAMPLE 12

According to the same procedure as in Example 11, the catalyst was prepared. The amount of palladium supported on the carrier consisting of the wire gauze and the iron-aluminum alloy was 2.20 g./square meter of apparent surface area, and the carrier had substantially the same particulars as in Example 11.

A reactor was charged with 4 g. of the catalyst by the same manner as in Example 11. The carbon monoxide conversion was carried out by passing a synthetic exhaust gas containing 2 % by volume of CO, 2 % by volume of O$_2$, 1,500 p.p.m. by volume of NO and the balance of nitrogen at a rate of 240 liters/hour through the reactor.

Further, the nitrogen oxide conversion was carried out by passing an exhaust gas containing 2 % by volume of CO, 1 % by volume of O$_2$, 1,500 p.p.m. by volume of NO and the balance of nitrogen and an exhaust gas containing 0.4 % by volume of CO, 0.2 % by volume of O$_2$, 270 p.p.m. by volume of NO and the balance of nitrogen, respectively, at a rate of 240 liters/hour through the reactor.

The results of activity test were shown in Table 6.

Table 6

| Composition of exhaust gas | | | | Carbon monoxide conversion | | | Nitrogen oxide conversion | | | |
|---|---|---|---|---|---|---|---|---|---|---|
| CO | O$_2$ | NO | N$_2$ | 250°C. | 300°C. | 350°C. | 250°C. | 300°C. | 350°C. | 400°C. |
| % | % | p.p.m. | — | % | | | % | | | |
| 2 | 2 | 1500 | balance | 50 | 100 | 100 | — | — | — | — |
| 2 | 1 | 1500 | balance | — | — | — | 10 | 45 | 90 | 100 |
| 0.4 | 0.2 | 270 | balance | — | — | — | 10 | 34 | 70 | 92 |

Furthermore, the specific surface areas of the wire gauze, the carrier obtained by providing the iron-aluminum alloy on the gauze and the catalyst supporting palladium were measured by gas chromatography according to the method reported by F. M. Nelsen in "Anal. Chem., Vol. 30, No. 5, 1387 (1958)." The results were as follows:

| Sample | Specific surface area (m.$^2$/g.) |
|---|---|
| Wire gauze | 0.005 |
| Carrier | 0.06 |
| Catalyst of the invention | 0.80 |

The actual surface areas of the carrier and the catalyst against one square meter of the apparent surface area were 13 m.$^2$ and 172 m.$^2$, respectively. It is clear from the above results that the actual surface area of the catalyst is extremely increased, and also the iron-aluminum alloy greatly contributes to increase of the activity.

EXAMPLE 13

A cylindrical reactor made of stainless steel having an inner diameter of 80 mm. and an effective length of 80 mm. was charged with 200 g. of catalyst prepared by the same manner as in Example 12. The reactor was installed at a bottom of automobile having a 1,200 cc. engine. The reactor was connected by employing a pipe having an inner diameter of 1.25 inches between a manifold flange and a muffler at a distance of 80 cm. from the manifold flange. Air was supplied by venturi installed in front of the reactor in order to maintain the oxygen content at the entrance of the reactor over 3 % by volume. The automobile exhaust gas from the engine which was run on a lead-free gasoline by light running at various speeds was contacted with the catalyst, and the effluent gas was analyzed by gas chromatography.

The results were shown in Table 7.

The engine was run for over 50 hours intermittently, but no deterioration of catalyst activity was observed.

What is claimed is:

1. A catalyst for purifying exhaust gases containing at least one of carbon monoxide, unburned hydrocarbon and nitrogen oxide which consists essentially of a base consisting of iron or steel, an iron-aluminum alloy provided on the surface of said base and a platinum group metal supported on said alloy; an average ratio of iron and aluminum in said alloy falling within the range of about 1:10 to about 10:1 by atomic ratio and said platinum group metal being supported in an amount of about 0.02 to about 20 g./square meter of apparent surface area, wherein the apparent surface area is less than the actual surface area.

2. The catalyst of claim 1, wherein said iron-aluminum alloy has an actual surface area of more than 2 times the apparent surface area and said catalyst has an actual surface area of more than 5 times the apparent surface area.

3. The catalyst of claim 1, wherein said iron-aluminum alloy has an actual surface area of more than 2 times the apparent surface area and said catalyst has an actual surface area in the range of 30 to 300 times the apparent surface area.

4. The catalyst of claim 1, wherein said iron-aluminum alloy contains a large number of hollows having an average diameter in the range of 10 to 100 $\mu$ and has a surface area of more than 2 times the apparent surface area.

5. The catalyst of claim 1, wherein said platinum group metal is at least one selected from the group consisting of platinum and palladium.

6. The catalyst of claim 1, wherein said base is steel base.

7. The catalyst of claim 6, wherein said steel base is stainless steel base.

8. The catalyst of claim 6, wherein said steel base is wire gauze made of stainless steel.

9. A process for preparing catalyst for the purification of exhaust gases containing at least one of carbon monoxide, unburned hydrocarbon and nitrogen oxide, which comprises applying a coating composition consisting essentially of aluminum powder and organic solvent on the surface of a base consisting of iron or steel, drying said composition, heating said base applied with Table 7

| Rotational frequency of engine | Temperature of exhaust gas | | Composition of exhaust gas at inlet | | | Purification | |
|---|---|---|---|---|---|---|---|
| | Inlet | Outlet | CO | Hydro-carbon* | O$_2$ | CO | Hydro-carbon* |
| r.p.m. | °C. | | % | p.p.m. | % | % | |
| 800 | 175 | 340 | 3.0 | 670 | 3.0 | 99 | 90 |
| 1500 | 255 | 345 | 1.9 | 600 | 3.4 | 100 | 83 |
| 2500 | 340 | 417 | 1.5 | 450 | 3.5 | 100 | 79 |
| 3500 | 465 | 410 | 0.8 | 280 | 3.3 | 100 | 81 |

*The value calculated as n-hexane aluminum at a temperature of about 500° to about 1,000°C for more than 1 minute to form an iron-aluminum alloy on said base and then supporting a platinum group metal on said alloy to give a catalyst consisting essentially of said base, said alloy on said base and said platinum group metal on said alloy; an average ratio of iron and aluminum in said alloy falling within the range of about 1:10 to about 10:1 by atomic ratio and said platinum group metal being supported in an amount of about 0.02 to about 20 g./square meter of apparent surface area, wherein the apparent surface area is less than the actual surface area.

* * * * *